US006622942B2

(12) United States Patent
Ueno et al.

(10) Patent No.: US 6,622,942 B2
(45) Date of Patent: Sep. 23, 2003

(54) OIL MIST DISCHARGER

(75) Inventors: Koji Ueno, Gifu (JP); Motohiro Tanaka, Chuo-Ku (JP)

(73) Assignees: K. K. Ueno Tekkojo, Gifu (JP); Tanaka Import Group, K. K., Osaka (JP)

( * ) Notice: Subject to any disclaimer, the term of this patent is extended or adjusted under 35 U.S.C. 154(b) by 107 days.

(21) Appl. No.: 09/836,068

(22) Filed: Apr. 17, 2001

(65) Prior Publication Data
US 2001/0038042 A1 Nov. 8, 2001

(30) Foreign Application Priority Data
Apr. 18, 2000 (JP) .......................... 2000-116261

(51) Int. Cl.[7] .................................. A62C 5/00
(52) U.S. Cl. .................. 239/311; 239/317; 239/318; 239/369; 239/407; 239/545
(58) Field of Search ................... 239/311, 317, 239/318, 543, 545, 565, 310, 373, 142, 337, 347, 344, 366, 369, 497, 498, 405, 550, 407; 137/114, 209

(56) References Cited

U.S. PATENT DOCUMENTS

| | | | |
|---|---|---|---|
| 3,954,921 A | * 5/1976 | Yoshida et al. | 239/550 |
| 4,111,362 A | * 9/1978 | Carter, Jr. | 239/545 |
| 4,309,456 A | * 1/1982 | Lock | 239/498 |
| 4,637,493 A | * 1/1987 | Ehlert | 184/55.1 |
| 5,902,457 A | * 5/1999 | Ford et al. | 239/405 |

* cited by examiner

*Primary Examiner*—Michael Mar
*Assistant Examiner*—Dinh Q. Nguyen
(74) *Attorney, Agent, or Firm*—Adams Evans P.A.

(57) ABSTRACT

An oil mist discharger (1) is disclosed. The oil mist discharger (1) utilizes a flow regulator (27) which comprises a main passage (28), sub-passages (29) and an agitation chamber (30). Differential pressure between air and oil is created and utilized in drawing oil into an oil feed chamber (39) to be mixed with air. The oil-containing air is sent to the flow regulator (27) and fed into the agitation chamber (30) via the main passage (28) and sub-passages (29) in jet streams to be transformed into a well blended oil mist, which is discharged from a discharge nozzle.

4 Claims, 5 Drawing Sheets

OIL MIST DISCHARGER

This application claims the priority date of Apr. 18, 2000 for Japanese Patent Application No. 2000-116261.

BACKGROUND OF THE INVENTION

1. Field of the Invention

This invention generally relates to a mist discharger. More particularly, this invention relates to a self-adjusting oil mist discharger.

2. Background Art

Conventionally, cutting oil such as lubricant is sprayed or dropped onto a cutting/drilling portion of a metallic or synthesized resin material being machined for lubrication and/or cooling so as to provide smooth cutting, prevent heat generation and eliminate damage to the cutting/drilling tool and the object material under treatment.

Of late, attempts have been made to reduce the amount of cutting oil used in cutting/drilling operations in order to reduce machining costs by saving on cutting oil and more importantly in consideration of the environmental preservation. Used cutting oil is conventionally treated in a costly way for recycling or disposal or simply disposed of in the nature.

A most desirous way to save on cutting oil without adversely affecting cutting or drilling operations is to discharge cutting oil in a mist form. In order to optimally provide an oil mist with conventional oil mist dischargers, very fine and delicate adjustment of the discharge performance is indispensable.

Conventionally, very time-consuming and highly burdensome manual adjustment of oil mist discharge performance is required every time cutting/drilling tools or discharge nozzles are changed for particular objects to be machined or for desired machining dimensions. Simplification of such adjustments in a conventional way may be possible, however not without unacceptably costly adjustment devices or complication of the whole systems.

If the adjustment of the conventional oil mist discharger is inappropriate, excessive or insufficient oil or lubricant in an inadequately formed mist will be discharged. Ordinary artisans in the relevant art know well that discharging of optimal oil mists requires highly sophisticated technology and know-how.

SUMMARY OF THE INVENTION

Accordingly, it is an object of the present invention to provide a mist discharger which is self-controlled and discharges optimal mists.

It is another object of the present invention to provide an oil mist discharger for use with a cutting/drilling tool which automatically adjusts itself corresponding to the caliber of a discharge nozzle used.

It is another object of the present invention to provide an oil mist discharger which discharges an oil mist which is optimally blended with air stream.

It is another object of the present invention to provide an oil mist discharger which is far more reliable than conventional oil mist dischargers.

It is still another object of the present invention to provide an oil mist discharger at a lower manufacturing cost than conventional oil mist dischargers by simplifying the overall structure.

Accordingly it is yet another object of the present invention to provide an oil mist discharger which requires less maintenance work than conventional oil mist dischargers.

It is another object of the present invention to provide novel flow regulating means for use in an oil mist discharger which automatically provides an optimal oil mist in accordance with the caliber of the nozzle.

It is still another object of the present invention to provide novel oil pressure regulating means for use in an oil mist discharger.

Other objects of the present invention will become apparent from the descriptions that follow, and those and other objects of the present invention are attained with an oil mist discharger of the present invention.

An oil mist discharger of the present invention is utilized with a cutting or drilling tool to machine objects such as metallic or plastic materials. The oil mist discharger provides a mist stream of lubricant or cutting oil onto the cutting/drilling spot of the object being machined most effectively and optimally. Insufficient or excessive provision of cutting oil in inappropriate oil particle sizes is avoided as the oil mist discharger of the present invention is provided with a self-adjusting mechanism to automatically discharge an optimal amount of cutting oil in an optimal mist form.

The oil mist discharger of the present invention utilizes a novel flow regulator of a compact size, which effectively and efficiently utilizes the differential pressure between air pressure and oil pressure so as to optimally draw cutting oil from an oil tank into air and optimally blend the introduced cutting oil with the air for discharging from the discharge nozzle against a cutting or drilling tool or against a machining spot. Such functions are provided in an automatic manner.

The flow regulator of the present invention comprises a main passage which is diverged into a plurality of sub-passage units at a plurality of locations. The sub-passage units are provided with different lengths. The main passage is substantially larger than the sub-passages in diameter. Each unit consisting of two sub-passages is forked from the main passage generally at right angles to the "right" and "left," having two identical openings.

Those two openings face each other across the main passage. The sub-passage units are provided on the main passage at different distances from the closed forward end of the main passage. Each unit of the "right" and "left" sub-passages forms a generally "circular" configuration, which is connected to an agitation chamber, where the oil-containing air streams coming in through the sub-passages converge and optimal agitation is provided so as to produce an optimally blended oil mist. The circular sub-passage units have different radii from one another.

The oil-containing air stream coming in through the main passage meets the closed forward end of the main passage, where the pressurized oil-containing air makes headway toward the openings of the sub-passages. When the air velocity is "high" (when the caliber of the discharge nozzle is "large"), the oil-containing air stream will enter substantially all sub-passage units, however, when the air velocity is "low" (when the caliber of the discharge nozzle is "small"), the oil-containing air stream will enter substantially fewer units of sub-passages which are closer to the forward end of the main passage.

It is an accepted theory that the higher the velocity of a fluid in a pipe, the lower the fluid pressure. It is to be noted that the velocity of the oil-containing air stream flowing through the main passage is a factor of the caliber of the discharge nozzle. Therefore, when the caliber of the discharge nozzle is "large," the air pressure in the main passage is "low," and when the caliber of the discharge nozzle is "small," the air pressure in the main passage is "large."

Cutting oil to be supplied in an airflow is drawn into the air stream through an oil outlet which is provided very close to the main passage or practically within the main passage by utilization of the differential pressure between the oil pressure in the built-in oil tank and the air pressure of the air stream. The lower the air pressure is (when the caliber of the discharge nozzle is large), the greater the differential pressure and the more oil is drawn into the air stream to provide a thicker oil mist in the agitation chamber.

When the caliber of the nozzle is "large," more cutting oil is blended in the air stream. The air stream carrying "much" oil comes out of all or a plurality of the sub-passage units into the agitation chamber in "fine" jet streams, facilitating excellent blending of the cutting oil and air in the agitation chamber into a micro particle oil mist. On the other hand, when the caliber of the nozzle is "small," a well blended micro particle oil mist is provided in the agitation chamber.

The oil pressure in the built-in oil tank is also regulated with a novel oil pressure regulator of the present invention and is held greater than the air pressure in the main passage or in the vicinity of the oil outlet when the oil mist discharger is in use, as will be readily appreciated by an ordinary artisan in the relevant art.

The oil pressure regulator of the present invention comprises a ball, O-ring, coil spring and oil cap having a leg. The airtightness between the O-ring and the ball is regulated with the oil cap and the coil spring.

The oil mist discharger of the present invention comprises other conventional devices and members including complete oil-air passage systems, which are described in detail hereunder in this specification.

BRIEF DESCRIPTION OF THE DRAWINGS

The present invention is described in further detail hereinbelow using the accompanying drawings, in which.

DETAILED DESCRIPTION OF PREFERRED EMBODIMENT

Before the present invention is further described using the accompanying drawings, it is important to be noted that the accompanying drawings are intended to be utilized for the description of the inventive concept only, and they do not faithfully depict the relative sizes, dimensions, locations or orientations of the devices and members shown. For example, the "flow regulator 27" and the "oil feed chamber 39" are actually provided much closer to each other or rather as "a unit." All devices and members shown between the flow regulator 27 and the oil feed chamber 39 are to be provided in actuality not to hinder the "positionally close" relationship between the flow regulator 27 and the oil feed chamber 39.

Figure 1:
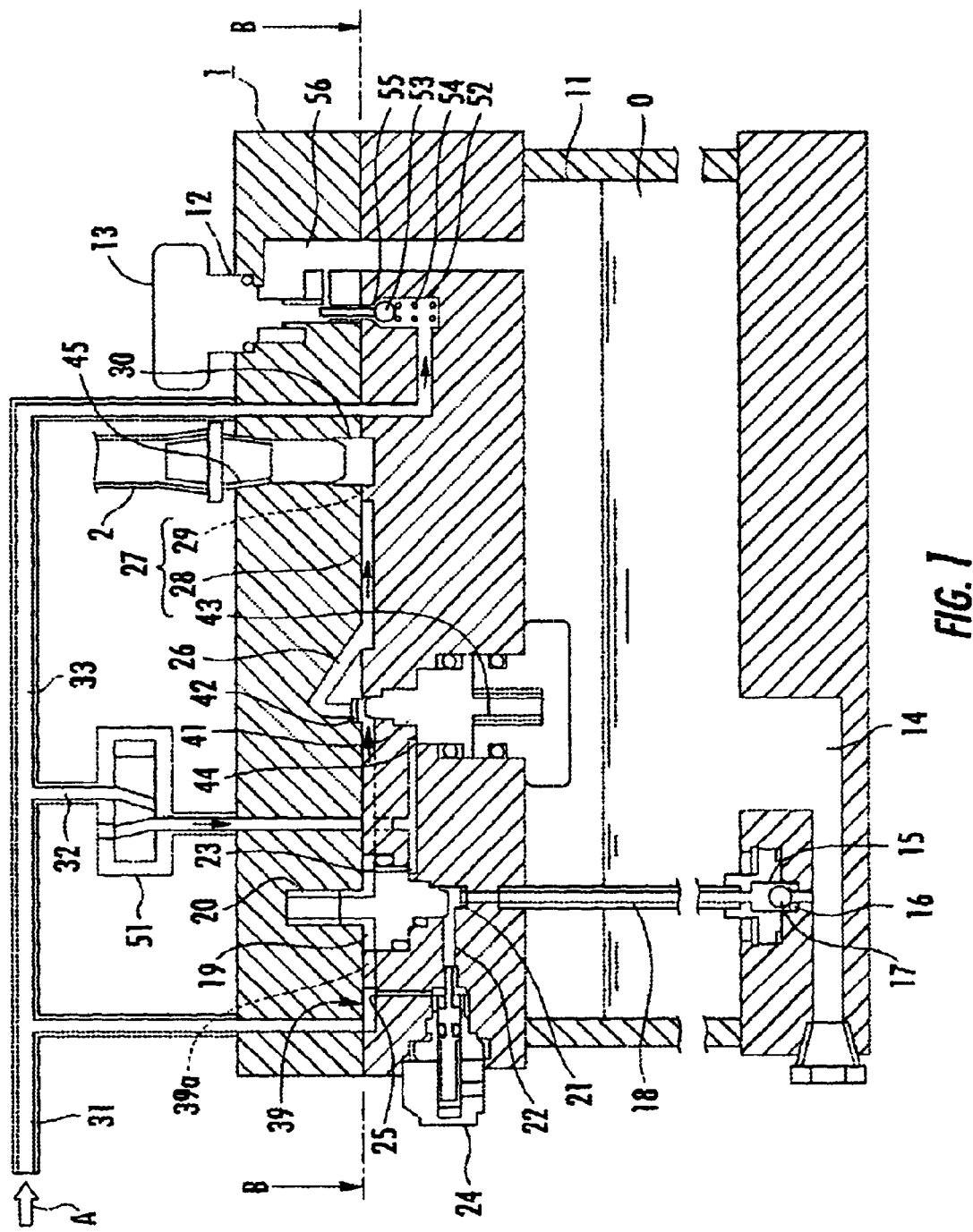
FIG. 1 is a sectional view of an oil mist discharger according to an embodiment of the present invention in its non-discharge state.
Figure 2:
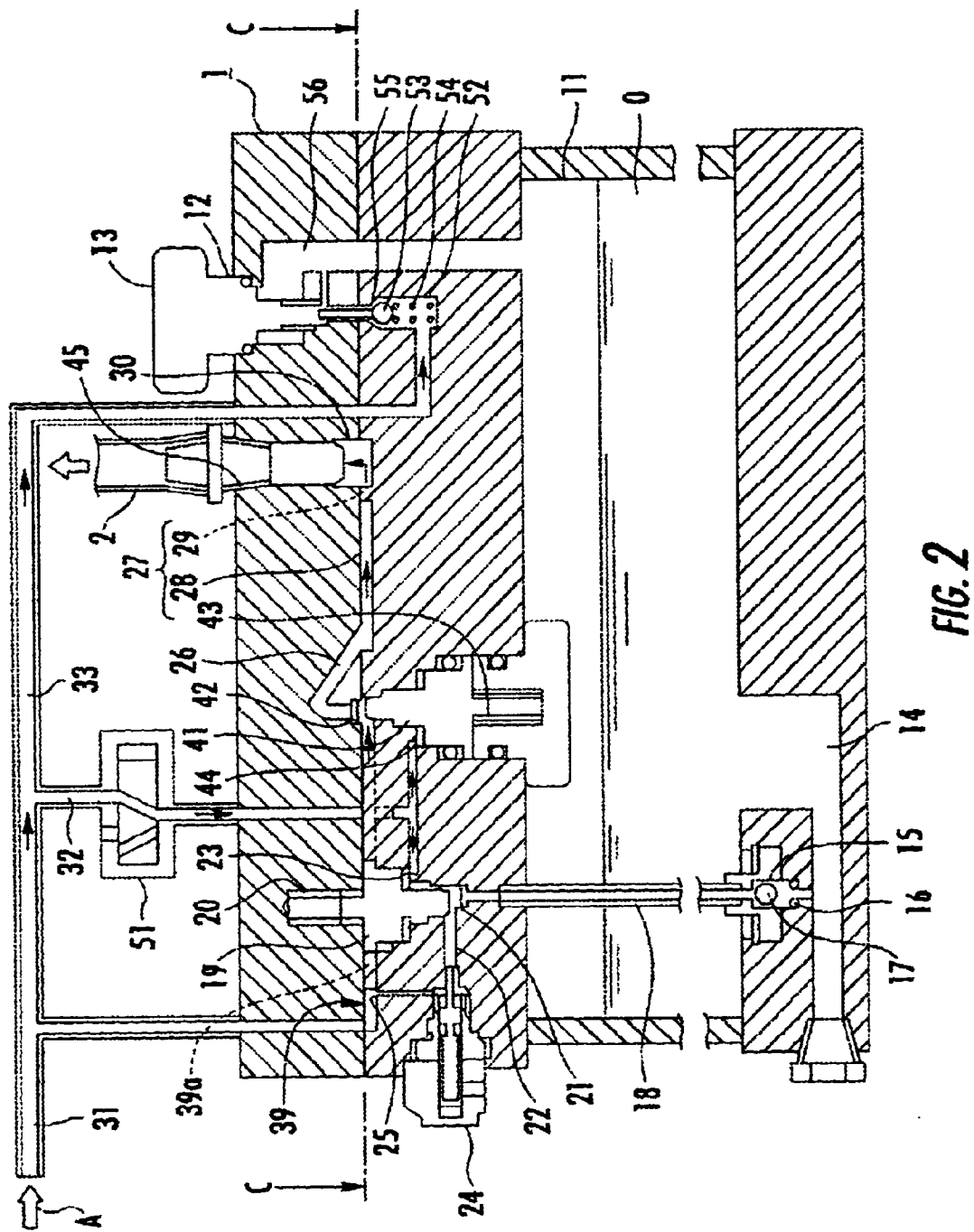
FIG. 2 is a sectional view of the oil mast discharger in its discharge state.

An oil mist discharger 1 according to an embodiment of the present invention is shown in FIG. 1 in its non-operating state and in FIG. 2 in its operating state. The oil mist discharger 1 discharges a mist of cutting oil "O" stored in a built-in oil tank 11 at an optimal discharge rate from a discharge nozzle (not shown) against an object (not shown).

There is provided a check valve 15 near the bottom 14 of the oil tank 11, comprising an O-ring 16 and a ball 17 placed on the O-ring 16 detachably. An oil feed pipe 19 extends upward from the check valve 15. The check valve 15 holds the cutting oil in the oil feed pipe 18 against the gravity so that the oil feed pipe 18 is always filled with cutting oil.

The oil feed pipe 18 is connected with a flow controller 19 in fluid communication. The flow controller 19 having a shoulder portion is biased downward against an O-ring 21 provided below with a coil spring 20 provided above. When the bottom of the flow controller 19 and the O-ring 21 are in a secure contact, cutting oil from the oil feed pipe 18 does not enter a side passage 22. Part of the pressurized air "A" coming through a main air pipe 31 enters a pilot passage 32, and through an air router 51 reaches an air press opening 23, where the pressurized air presses the shoulder portion of the flow controller 19 upward against the coil spring 20 to detach the bottom of the flow controller 19 from the O-ring 21, when cutting oil from the oil feed pipe 18 flows into the side passage 22 assisted by the internal pressure of the oil tank.

The cutting oil passing through the side passage 22 goes to an oil rate adjuster 24 which preadjusts the rate of the cutting oil to be discharged from the discharge nozzle (not shown). The cutting oil then advances to an oil feed outlet 25 which has access to an oil feed chamber 39, where the oil is fed into an air stream coming from the main air pipe 31.

Figure 3:
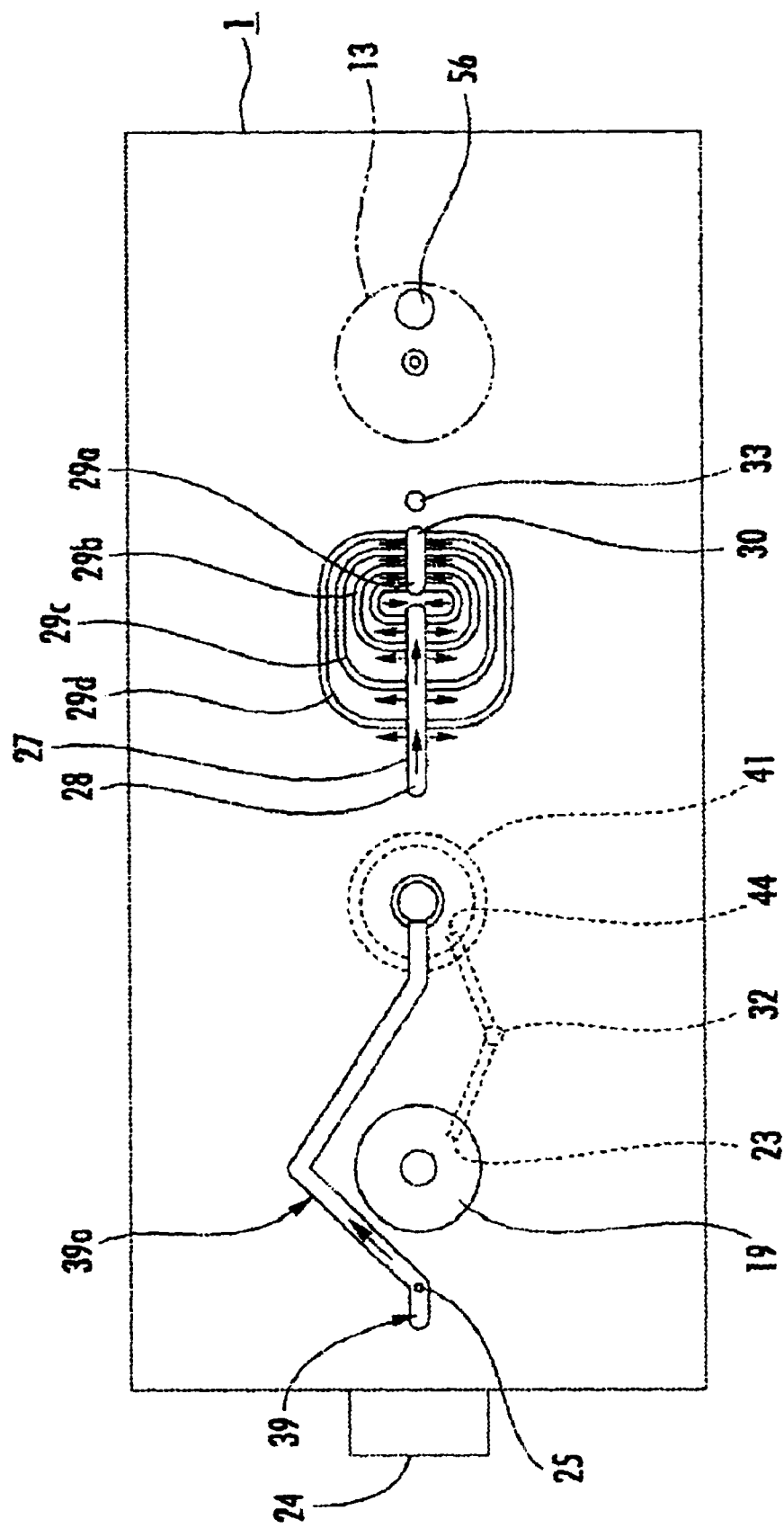
FIG. 3 is a sectional view of the oil mist discharger taken along line B—B of FIG. 1.

The oil-containing air stream advances through a transit passage 39a to a switch valve 41 having a shoulder portion (see FIG. 3). The switch valve 41 is biased upward against an O-ring 42 provided above by a coil spring 43 provided below, and is regulated by air pressure of the pressurized air from the pilot passage 32 coming through the air router 51, which applies pressure to the shoulder portion via an air pressure opening 44.

The switch valve 41 is held open to the oil-containing air stream against the coil spring 43 when the oil mist discharger 1 is in use. The switch valve 41 is held closed against the oil-containing air stream with the coil spring 43 when the oil mist discharger 1 is idling. There is provided a transit passage 26 between the switch valve 41 and a flow regulator 27.

Figure 4:
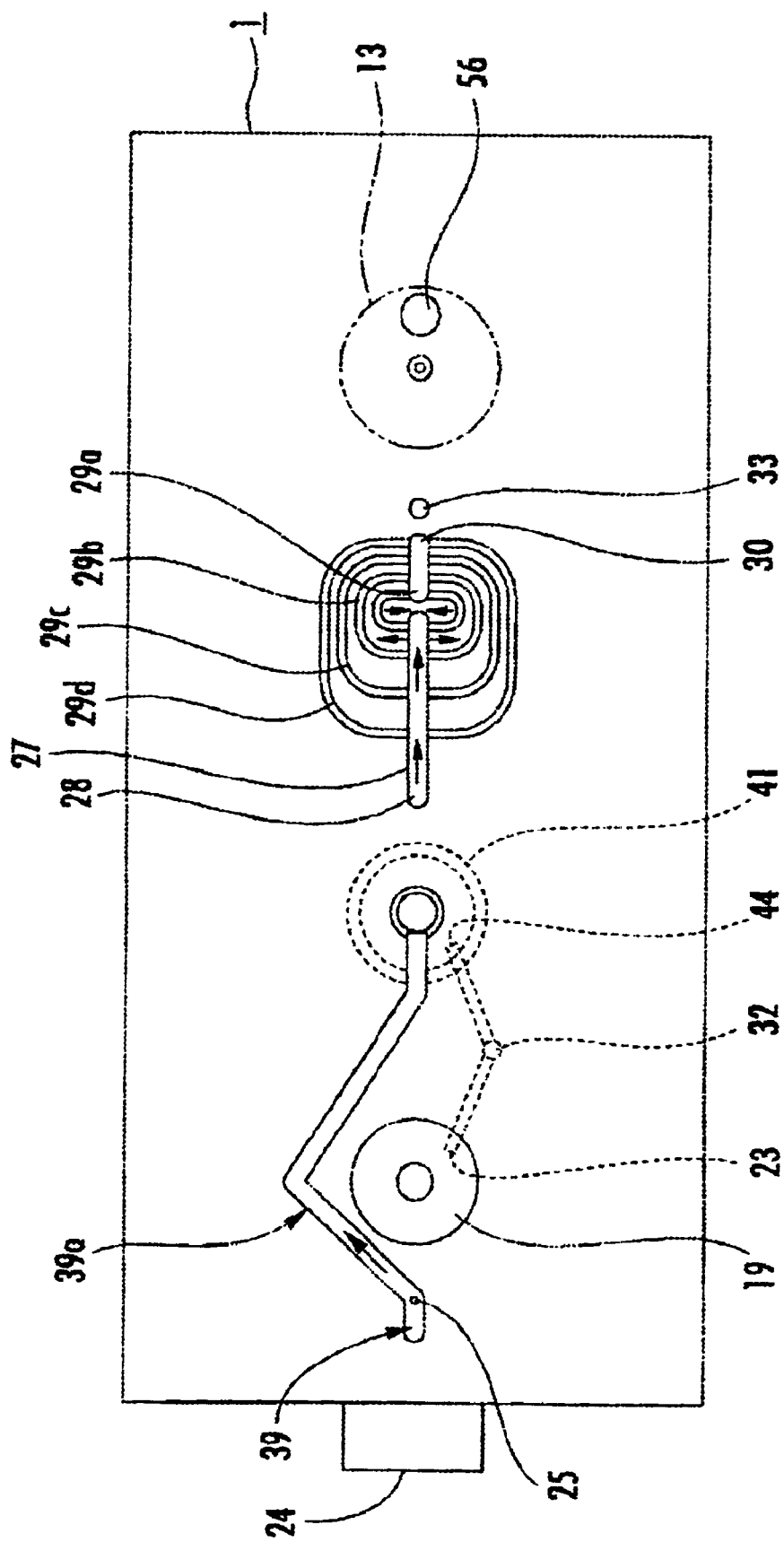
FIG. 4 is a sectional view of the oil mist discharger taken along line C—C of FIG. 2.

As shown in FIGS. 3 and 4, the flow regulator 27 comprises a main passage 28 whose forward end is closed (although it is possible in another embodiment to provide another fine passage to the forward end) and a plurality of sub-passage units 29. The sub-passages 29 are provided substantially much finer than the main passage 28. The sub-passages 29 are forked in two directions (right and left) from the main passages 28, into forked passages 29a, 29b, 29c and 29d in this embodiment. The number of the sub-passages 29 is a factor to be determined in designing of the flow regulator 27. The diameter and the overall configuration of the sub-passages 29 are also factors of designing.

The forked passages 29a–29d are forked from the main passage 28 at different locations. In this embodiment, the forked passages 29a are provided closest to the closed end of the main passage 28, the forked passages 29b are provided the second closest to the closed end, the forked passages 29c are provided the third closest to the closed end, and the forked passages 29*d* are provided the farthest from the closed end of the main passage 28.

Thus, as an ordinary artisan in the relevant art will readily appreciate, the "flow resistance" to and through the forked passages 29*a* is the smallest while the "flow resistance" to and through the forked passages 29*d* is the greatest against the air stream entering the flow regulator 27.

These forked passages 29*a*–29*d* are provided in a circular configuration in this embodiment. The radius of the forked passages 29*a* is the smallest and the radius of the forked passages 29*d* is the greatest, the passages 29*a* being the shortest and the passages 29*d* being the longest. The forked passages 29*a*–29*d* are converged into an agitation chamber 30 which is part of the flow regulator 27. The agitation chamber 30 is thus in fluid communication with the opening of the switch valve 41, the opening of the flow controller 19 and the oil feed chamber 39, and receives the oil-containing air stream when the oil mist discharger 1 is in use.

The agitation chamber 30 is connected with a hose connector 45 to which a hose 2 (partially shown) is securely connected. On the other end of the hose 2 is provided a discharge nozzle (not shown) having a certain caliber, which is provided in the vicinity of a cutting or drilling tool (not shown).

In another embodiment of the present invention, this oil mist discharger may be used for other mist discharging purposes of non-oil materials for non-cutting/drilling operations.

A stream of pressurized air "A" going through the main air pipe 31 as supplied from an external air pump device or compressor (not shown) supplies air to the oil feed chamber 39, and is forked into the pilot passage 32 and an oil pressure passage 33.

The oil pressure passage 33 is provided in fluid communication with the oil tank 11 through an oil pressure regulator 52 when the oil pressure regulator 52 is open. The oil pressure regulator 52 comprises a cap 13, ball 53, coil spring 54 and O-ring 55. The cap 13 is provided with a long leg. The oil pressure regulator 52 is in fluid communication with the oil tank 11 via an oil supply pipe 56.

Figure 5:
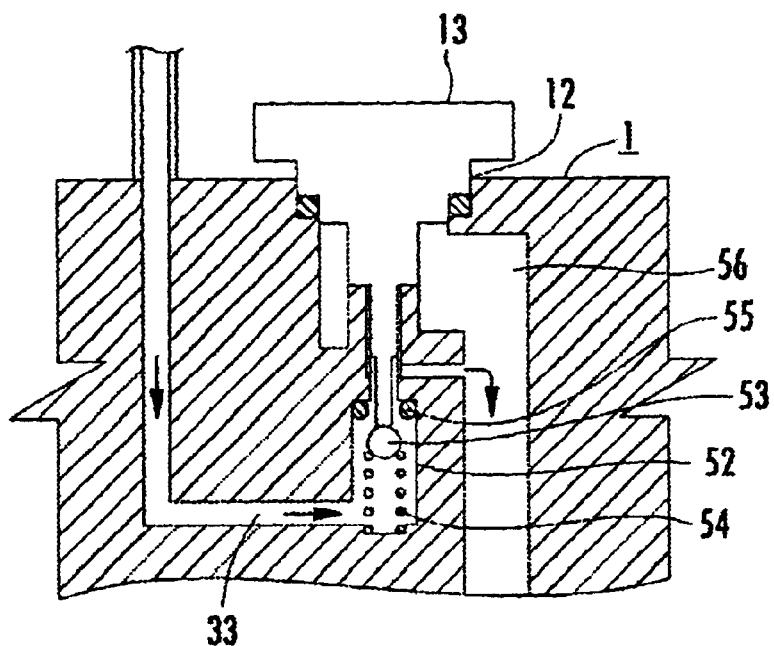
FIG. 5 is a sectional view of an oil pressure regulator according to an embodiment of the present invention.

When the cap 13 is secured in place as shown in FIG. 5, the leg of the cap 13 presses the ball 53 downward against the bias from the coil spring 54 and detaches the ball 53 from the O-ring 55, providing fluid communication between the oil pressure passage 33 and the oil tank 11, when the internal pressure of the oil tank 11 becomes equal to the air pressure in the oil pressure passage 33.

The pressurized cutting oil pushes the ball 17 upward and detaches the ball 17 from the O-ring 16 of the check valve 15 against the gravity, and presses upward the cutting oil which fills up the oil feed pipe 18.

Figure 6:
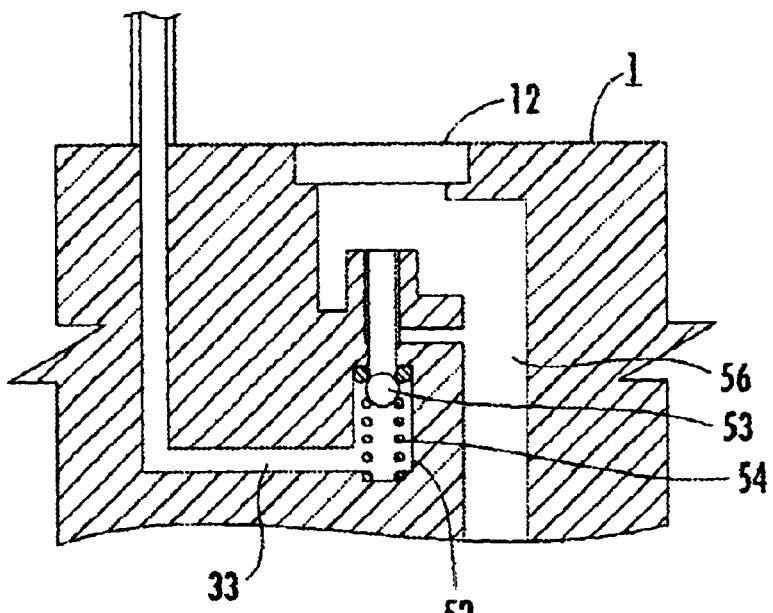
FIG. 6 is a sectional view of the oil pressure regulator of FIG. 5 in its working state.

When the cap 13 is loosened or removed as shown in FIG. 6, the coil spring 54 biases the ball 53 back onto the O-ring 55 and the ball 53 securely rests on the O-ring 55, closing the access to the oil pressure passage 33. It is now possible to supply the tank 11 with fresh cutting oil.

In the following is provided descriptions how the oil mist discharger 1 of the present invention constructed as such functions.

When the air router 51 is closed as shown in FIG. 1, pressurized air "A" does not work at either the air press opening 23 or the air press opening 44. Therefore, neither the flow controller 19 nor the switch valve 41 opens. When the cap is loosened, the leg of the cap 13 does not press the ball 53 away from the O-ring 55. The pressurized air does not advance through the oil pressure passage 33.

As the cap 13 is tightened and its leg presses the ball 53 downward to detach the ball 53 from the O-ring 55 and when the air router 51 is open as shown in FIG. 2, pressurized air flows in through the pilot passage 32 and passes through the air press opening 23 to lift the flow controller 19 against the bias from the coil spring 20 to "open" and through the air press opening 44 to press down the switch valve 41 against the coil spring 43 to "open." The oil pressure regulator 52 lets the pressurized air go into the oil tank 11 through the oil supply pipe 56.

The ball 17 in the check valve 15 is pressed up from the O-ring 16 and the check valve 16 opens. The cutting oil filling up the oil feed pipe 18 immediately enters the side passage 22. The oil as regulated with the oil rate adjuster 24 advances and is drawn into the oil feed chamber 39 through the oil feed outlet 25, where the air pressure is lower than the air or oil pressure in the oil tank 11. The drawn oil is carried away by the pressurized air stream supplied from the main air pipe 39.

The oil-carrying air stream goes through the openings provided by the flow controller 19 and the switch valve 41 to the flow regulator 27. The flow regulator 27 regulates the oil-carrying air stream as described earlier. The oil feed chamber 39 whose diameter is preferably no larger than the main passage 28 of the flow regulator 27 is provided in the close vicinity of the main passage 28 or within the main passage 28. The air pressure in the oil feed chamber 28 is provided lower than the internal pressure of the oil tank 11.

In the agitation chamber 30, fine air streams jet out of the forked passages 29*a*–29*d* substantially against each other from two opposite openings, respectively, and collide with each other, which promotes homogeneity of the blend of the air and oil, and forms an oil mist of micro particles. The oil mist advances through the hose connector 45 into the hose 2 to be discharged in a mist form from the nozzle (not shown) installed on the other end of the hose 2.

The flow regulator 27 is further described hereunder. The caliber of a discharge nozzle used for discharging an oil mist is typically 1 mm–3 mm. When the caliber of the discharge nozzle (not shown) is as large as 3 mm, the flow rate of the air flowing through the main air pipe 31 is greater than a case where the caliber is smaller than 3 mm, and more oil will be contained in the air as described earlier.

The oil-containing air stream having a large flow rate is eventually sent to the flow regulator 27, and enters the main passage 28. The oil-carrying air stream then enters the first forked passages 29*a*, the second forked passages 29*b*, the third forked passages 29*c* and the fourth forked passages 29*d* (in this embodiment) and respectively exits from the first, second, third and fourth forked passages into the agitation chamber 30. An optimally blended micro oil mist is produced in the agitation chamber 30 in this way.

The air pressure in the oil feed chamber 39 is lower than a case where the caliber of the discharge nozzle is smaller than 3 mm, which provides a greater differential pressure against the oil pressure in the oil tank 11, resulting in greater supply of cutting oil into the oil feed chamber 39.

On the other hand, when the caliber of the discharge nozzle is 1 mm, the flow rate of the air in the main air pipe 31 is smaller than a case where the caliber is larger than 1 mm. The air which contains less cutting oil progresses into the main passage 28 and will substantially enter fewer forked passages. The air streams containing less oil converge in the agitation chamber 30 and produce an optimal "thin" oil mist for that nozzle. The air pressure in the oil feed passage 39 is greater than a case where the caliber of the nozzle is greater than 1 mm, producing a smaller differential pressure against the oil pressure in the oil tank 11.

In a case where the caliber of the discharge nozzle is between 1 mm and 3 mm, the air stream in the main passage 28 will substantially pass through the first forked passages 29a and second forked passages 29b, or the first forked passages 29a, second forked passages 29b and third forked passages 29c in this embodiment, supplying an amount of cutting oil into the oil feed chamber 39 in proportion to the dimension of the caliber.

Without the flow regulator 27 of the present invention, very complicated and costly mechanism would be required to produce an optimal oil mist which is most desirable for particular occasions of use.

It is to be noted that the present invention provides a non-oil mist discharger as well.

The exact and precise scientific and theoretical descriptions of the advantageous features of the present invention in relation to the flow regulator 27 may not be presently available. However, the inventor of the present invention has worked on the present invention for years and proved through numerous experiments that the oil mist discharger 1 of the present invention actually works as desired, and provides a number of advantages over prior art oil mist dischargers. Such advantages have been described earlier.

While the present invention has been described in connection with preferred embodiments and drawings, numerous alterations and changes thereto will occur to ordinary people skilled in the art within the scope of the present invention. Accordingly, only the appended claims should restrict the scope of the present invention.

What is claimed is:

1. A liquid mist discharger comprising a liquid tank, a discharge nozzle, an air conducting system to be connected with an external air compressor, a liquid conducting system in fluid communication with the liquid tank, and a flow regulator provided in fluid communication with both the air conduction system and the liquid conduction system, wherein the flow regulator is further connected in fluid communication with a liquid feed chamber provided upstream therefrom to receive a fluid-carrying air which is a blend of air supplied from the air conducting system and liquid which is supplied into the liquid feed chamber from liquid conducting system through utilization of the differential pressure between the liquid feed chamber and the liquid tank and an agitation chamber provided downstream therefrom to feed the fluid-carrying air thereto, wherein the flow regulator produces a liquid mist by jetting the liquid-carrying air in a plurality of stream into the agitation chamber, and discharges the liquid mist through the discharge nozzle, wherein said flow regulator comprises a main passage and a plurality of sub-passages in addition to said agitation chamber, wherein said sub-passages are forked from the main passage at different places, each of the sub-passages having a diameter which is smaller than the diameter of the main passage.

2. A liquid mist discharger according to claim 1, wherein said sub-passages are provided in a generally circular configuration.

3. A liquid mist discharger according to any of claim 1 or 2 wherein said liquid is cutting oil.

4. A liquid mist discharger comprising a liquid tank, a discharge nozzle, an air conducting system to be connected with an external air compressor, a liquid conducting system in fluid communication with the liquid tank, and a flow regulator provided in fluid communication with both the air conduction system and the liquid conduction system, wherein the flow regulator is further connected in fluid communication with a liquid feed chamber provided upstream therefrom to receive a fluid-carrying air which is a blend of air supplied from the air conducting system and liquid which is supplied into the liquid feed chamber from the liquid conducting system through utilization of the differential pressure between the liquid feed chamber and the liquid tank, and an agitation chamber provided downstream therefrom to feed the fluid-carrying air thereto, wherein the flow regulator produces a liquid mist by jetting the liquid-carrying air in a plurality of stream into the agitation chamber, and discharges the liquid mist through the discharge nozzle, wherein said liquid is cutting oil.

* * * * *